3,278,549
WATER-SOLUBLE DYESTUFFS AND PROCESS FOR PREPARING THEM

Otto Scherer, Bad Soden, Taunus, and Klaus Uhl, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Oct. 26, 1964, Ser. No. 406,583
Claims priority, application Germany, Oct. 28, 1963, F 41,126
4 Claims. (Cl. 260—314.5)

The present invention provides water-soluble dyestuffs and a process for preparing them; more particularly, it provides water-soluble dyestuffs of the general Formula 1

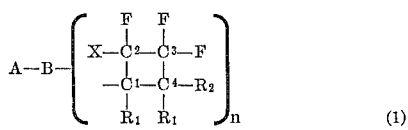

(1)

in which A represents the radical of a dyestuff molecule of any organic dyestuff class, B represents

—NHCO—, —N—CO—, —NHSO$_2$—, —NHCOCH=CH—
        |
        CH$_3$

—N—COCH=CH—, —NHCOCH$_2$CH$_2$— or —NHSO$_2$CH$_2$CH$_2$—
|
CH$_3$ $R_1$, $R_2$ each represent hydrogen or chlorine atoms or carboxylic acid groups, cyano groups, nitro groups, sulfonic acid groups or the groupings —R′, —OR′, —COOR′′′, —SO$_2$—NR′R′′, —SO$_2$—R′ or —CO—NR′R′′, and the two substituents $R_1$ together may represent double bond between the carbon atoms $C_1$ and $C_4$, R′ and R′′ each herein represent hydrogen atoms or alkyl or aryl groups, R′′′ represents an alkyl or aryl group, X represents a hydrogen or halogen atom, preferably a fluorine or chlorine atom, and $n$ represents an integer from 1 to 5.

Now, we have found that valuable water-soluble dyestuffs of the above Formula 1 can be prepared by reacting 1 mol of a dyestuff of the general formula A—Z$_m$, in which A has the meaning given above, $m$ represents an integer from 1 to 5, and Z represents an amino group, with 1 to 5 mols of a compound of the general Formula 2

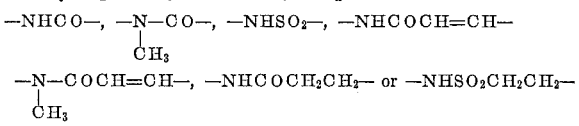

(2)

in which $R_1$, $R_2$ and X have the meanings given above and B$^1$ represents one of the groupings —CO—Halogen, —SO$_2$—Halogen, —CH$_2$—CH$_2$—SO$_2$—Halogen, —CH=CH—CO—Halogen and —CHR′—CHR′′—CO—Halogen, at temperatures in the range of from about 0° to about 80° C., preferably in the range of from about 10° C. to about 30° C., in an aqueous, aqueous-organic or purely organic medium, in a pH-range of from about 6.5 to about 10, in the presence of an acid binding agent.

As dyestuffs there may be used, for example, monoazo dyestuffs, disazo dyestuffs, trisazo dyestuffs, diphenylmethane dyestuffs, triphenylmethane dyestuffs, anthraquinone dyestuffs, phthalocyanine dyestuffs, nitro dyestuffs, acridone dyestuffs, oxazine dyestuffs, dioxazine dyestuffs, indigoid or thioindigoid dyestuffs, derivatives of perylenetetracarboxylic acid, thiazole dyestuffs, acridine dyestuffs.

As reaction components of the above indicated Formula 2, there may be used, for example, the following compounds: 2,2,3,3,-tetrafluorocyclobutanic acid chloride-1, 2-chloro-2,3,3-trifluorocyclobutanic acid chloride-1, 3-(2′,2′,3′,3′-tetrafluorocyclobutyl)-acrylic acid chloride, 3-(2′-chloro-2′,3′,3′-trifluorocyclobutyl)-acrylic acid chloride, 3-(4′-methyl-2′-chloro-2′,3′,3′-trifluorocyclobutyl)-acrylic acid chloride, 2-(2′,2′,3′,3′-tetrafluorocyclobutyl)-ethane sulfochloride. The compounds of the general Formula 2 which are to be used for the reaction of the present invention, may be prepared according to the method described in "Houben-Weyl," volume 5/3, page 260.

When the reaction is carried in an aqueous or aqueous-organic medium, it is suitable to use hydroxides, carbonates or hydrogen carbonates of the metals of the first to third group of the Periodic System as acid binding agents. When the reaction is carried out in an organic system, tertiary organic bases such, for example, as dimethyl aniline, pyridine or picoline, are preferably used as acid binding agents.

The reaction according to the present invention may also be carried out at a temperature above or below the indicated temperature range; however, if the reaction is carried out at lower temperatures, the reaction times are correspondingly longer, and if the reaction is carried out at higher temperatures, the yields are smaller. The optimum temperature to be used in each individual case must be adapted to the reaction components used.

The dyestuffs obtainable by the process of the present invention give on cellulose fibers and protein fibers dyeings and prints that have good fastness to wet processing.

Dyeing is carried out in an alkaline medium, preferably in the pH-range of between 8 and 11, at temperatures of between about 20° C. and about 140° C., preferably at temperatures of between about 40° C. and about 105° C.

The following examples illustrate the invention, but they are not intended to limit it thereto:

Example 1

56.1 parts by weight of 1-acetamino-4′-amino-6′-sulfonic acid-7-azobenzene-8-hydroxy-naphthalene-3,6-disulfonic acid were adjusted to pH 8 by means of binormal sodium carbonate solution. 19.05 parts by weight of 2,2,3,3-tetrafluorocyclobutanic acid chloride-1, dissolved in 25 parts by volume of acetone, were then added dropwise. At the same time, a solution of 6 parts by weight of sodium carbonate and 20 parts by volume of water was added dropwise in such a manner that a pH-value of 7.5–8 was maintained. The whole batch was then brought to pH 4 by means of concentrated hydrochloric acid and then stirred for 45 minutes. After salting out with sodium chloride, there were obtained 70 parts by weight of the dyestuff of the formula

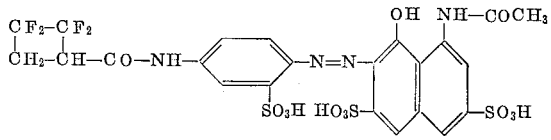

When the sodium carbonate solution was replaced by a solution of 4 parts by weight of sodium hydroxide in 50 parts by volume of water and the above mentioned pH-value was maintained with this solution, the same result as above was obtained.

2 g. of a cotton fabric were introduced into 10 ml. of a solution of 2 parts by weight of the above dyestuff in 100 parts by weight of water. 10 ml. of a binormal sodium carbonate solution were added. The whole was then heated for some minutes on the steam bath and then boiled twice with each time 20 ml. of water and one with 20 ml. of a 2 percent by weight aqueous solution of a synthetic detergent, each time for 5 minutes.

A violet tinged red dyeing having an excellent fastness to wet processing was obtained.

Example 2

By reacting 56.1 parts by weight of 1-acetamino-4'-amino-6'-sulfonic acid-7-azobenzene-8-hydroxy-naphthalene-3,6-disulfonic acid with 22.6 parts by weight of 1-chloro-2,2,3,3-tetrafluorocyclobutane-carboxylic acid chloride-1 under the reaction conditions described in Example 1, there was obtained the dyestuff of the formula

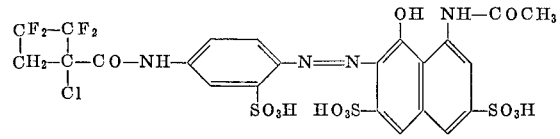

When the sodium carbonate solution was replaced (compare in this respect Example 1) by a solution of 10 parts by weight of sodium bicarbonate in 200 parts by volume of water, the same result was obtained.

Example 3

By reacting 56.1 parts by weight of 1-acetamino-4'-amino-6'-sulfonic acid-7-azobenzene-8-hydroxy-naphthalene-3,6-disulfonic acid with 21.65 parts by weight of 3-(2',2',3',3'-tetracyclobutyl)-acrylic acid chloride under the reaction conditions described in Example 1, there was obtained the dyestuff of the formula

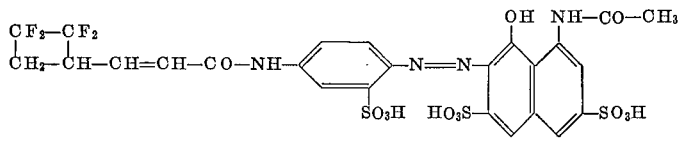

Example 4

By reacting 56.1 parts by weight of 1-acetamino-4'-amino-6'-sulfonic acid-7-azobenzene-8-hydroxy-naphthalene-3,6-disulfonic acid with 26.5 parts by weight of 4-phenyl-2,2,3,3-tetrafluoro-cyclobutane-carboxylic acid chloride under the reaction conditions described in Example 1, there was obtained the dyestuff of the formula

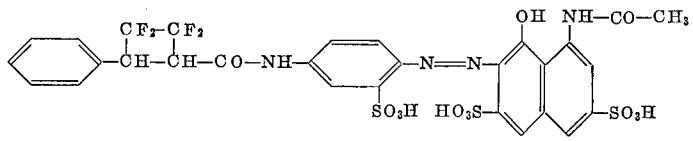

Example 5

By reacting 56.1 parts by weight of 1-acetamino-4'-amino-6'-sulfonic acid-7-azobenzene-8-hydroxy-3,6-disulfonic acid with 20.7 parts by weight of 2-chloro-2,3,3-trifluorocyclobutanic acid chloride-1 under the reaction conditions described in Example 1, there was obtained the dyestuff of the formula

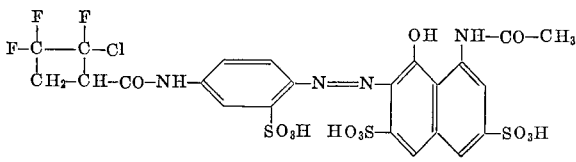

Example 6

A solution of 42.1 parts by weight of 2'-methyl-4'-amino-2-azobenzene-naphthalene-4,8-disulfonic acid was adjusted to pH 7.5 by means of a sodium carbonate solution. To this solution were then added 19.05 parts by weight of 2,2,3,3-tetrafluorocyclobutane carboxylic acid chloride, dropwise and at 25° C. At the same time a solution of 6 parts by weight of sodium carbonate in 20 parts by weight of water was then dropwise added in such a manner that the pH-value of 8 was not surpassed. There was obtained the dyestuff of the formula

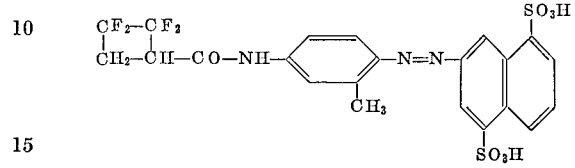

The dyestuff gave on cotton a full yellow shade having very good fastness to wet processing.

Example 7

48.8 parts by weight of 1-amino-4-(4'-amino)-phenyl-amino-anthraquinone-2,6-disulfonic acid were reacted at 15° C., while maintaining a pH-range of 6.5–7.5, with 19.05 parts by weight of 2,2,3,3-tetrafluoro-cyclobutanic acid chloride-1, while simultaneously adding a solution of 4 parts by weight of sodium hydroxide in 80 parts by volume of water. There was obtained the dyestuff of the formula

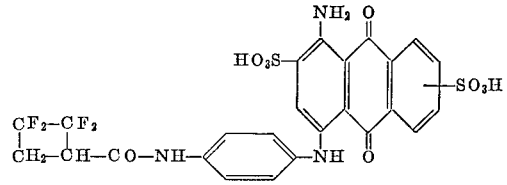

The dyestuff gave on cotton a clear greenish blue shade having very good fastness to wet processing.

Example 8

Binormal sodium hydroxide solution was added to 51.8 parts by weight of the aminoazo compound obtained by coupling diazotized 4-nitro-4'-amino-stilbene-2,2'-disulfonic acid with N-methylaniline, until a pH-value of 8 was reached. The whole was then heated to 40° to 45° C. and 21.7 parts by weight of 3-(2',2',3',3'-tetrafluorocyclobutyl)-acrylic acid chloride, diluted with 50 parts by volume of acetone, were added dropwise. The pH-value of 7.5–8 was maintained by the simultaneous addition of binormal sodium hydroxide solution. The whole was acidified with acetic acid to pH 5 and salted out as usual with sodium chloride. There was obtained the dyestuff of the formula

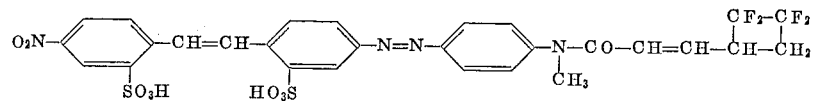

which, when applied to a cotton fabric at 80° C. from a long bath, while using trisodium phosphate as the alkaline agent, gave a yellow shade having excellent fastness to wet processing.

*Example 9*

A solution of 45.3 parts by weight of the aminoazo compound obtained by coupling of diazotized 3-acetamino-1-aminobenzene-6-sulfonic acid with 1-(4'-sulfophenyl)-5-pyrazolone-3-carboxylic acid and hydrolysis of the acetyl compound in aqueous solution by means of a sodium hydroxide solution, was adjusted to pH 8. 22.5 parts by weight of 1-chloro-2,2,3,3-tetrafluoro-cyclobutane-carboxylic acid chloride-1 in 50 parts by volume of acetone were added. Simultaneously, a pH-value of 7.5 to 8 was maintained by dropwise addition of an aqueous binormal sodium carbonate solution. The whole was then acidified to pH 5 by means of a small amount of glacial acetic acid and the dyestuff of the formula

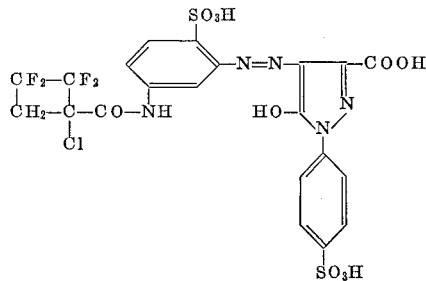

was precipitated by means of 100 parts by volume of a saturated sodium chloride solution. The dyestuff, when applied in an alkaline bath to cotton, gave a reddish shade having very good fastness to wet processing.

When a cotton fabric was printed, using sodium bicarbonate as the alkaline agent, there was obtained, after thermo-setting in a continuously operating steamer and after processing according to the methods usual for reactive dyestuffs, a reddish yellow print having very good fastness to wet processing.

*Example 10*

By acylating 42.3 parts by weight of the aminoazo compound obtained by coupling diazotized 1-aminobenzene-2-sulfonic acid with 2-amino-5-hydroxynaphthalene-7-sulfonic acid, with 24.15 parts by weight of 1,2-dichloro-2,3,3,-trifluorocyclobutane-carboxylic acid chloride-1, under the reaction conditions described in Example 1, there was obtained the dyestuff of the formula

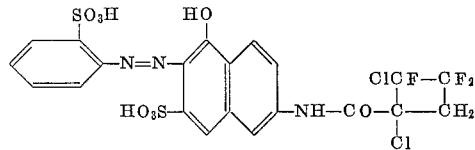

which gave on cellulose materials orange red dyeings or prints that showed good to very good fastness to wet processing. When, for example, after printing with a neutral printing ink onto a cotton fabric, the printed fabric was passed through an alkaline, salt-containing padding liquor and the dyestuff was then thermo-set in a two-phase steamer, an orange print was obtained that had good fastness to wet processing.

*Example 11*

By reacting 43.7 parts by weight of the aminoazo compound, prepared by coupling diazotized aniline with 1 - methylamino - 8 - hydroxynaphthalene - 3,6, - disulfonic acid under known conditions, with 18.9 parts by weight of 2,2,3,3 - tetrafluorocyclobutene - 4 - carboxylic acid chloride-1 under the reaction conditions described in Example 9, there was obtained the dyestuff of the formula

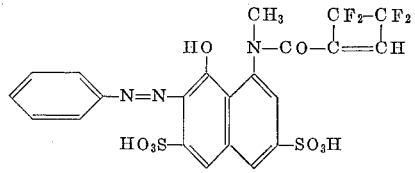

which gave on cellulose materials a red dyeing having good fastness to wet processing.

When cotton fabric was printed with a neutral printing colour and the dyestuff was thermo-set by a short passage of the printed fabric through a hot, alkaline, salt-containing bath, there was obtained a red print that showed good fastness to wet processing.

*Example 12*

47.5 parts by weight of the disazo dyestuff prepared by coupling diazotized 4-amino-1,1'-azobenzene-3,4'-disulfonic acid with 3-methyl-1-aminobenzene, were reacted under the reaction conditions described in Example 1 with 22.1 parts by weight of 1-methyl-2,2,3,3-tetrafluoro cyclobutane carboxylic acid chloride-1. There was obtained the dyestuff of the formula

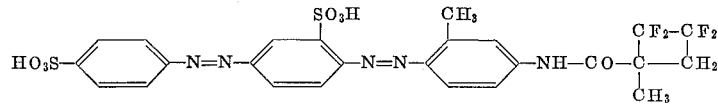

which when applied to cotton in an alkaline bath gave yellow brown shades that showed good fastness to wet processing.

When a staple fibre fabric was printed with a printing paste containing sodium hydroxide as the alkaline agent, there was obtained, after thermo-setting, a yellow brown print that exhibited very good fastness to wet processing.

*Example 13*

By reacting 48.8 parts by weight of 1-amino-4-(3'-amino-phenylamino) - anthraquinone - 2,4' - disulfonic acid with 22.7 parts by weight of 2,2,3,3-tetrafluorocyclobutane-sulfonic acid chloride-1 under the conditions described in Example 9, there was obtained the dyestuff of the formula

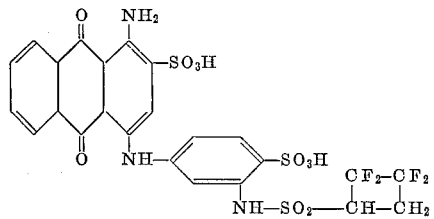

which when applied to cotton under the conditions described in Example 1, gave blue shades that had excellent fastness to wet processing.

When the dyestuff was printed on a linen fabric in the presence of sodium carbonate and the dyestuff was thermo-set by steaming in a continuously operating steamer, there was obtained a blue print having very good fastness to wet processing.

*Example 14*

76.3 parts by weight of [Cu-phthalocyanine-(4'-sulfo-3'-aminosulfonic acid anilide)-trisulfonic acid], prepared by the reaction of a tertiary organic base and a mixture of Cu-phthalocyanine-tetrasulfochloride and the sodium salt of 1,2-diamino-benzene-4-sulfonic acid in aqueous suspension (French Patent 181,249, Example 6), were acylated with 21.7 parts by weight of 3-(2′,2′,3′,3′-tetra-fluorocyclobutyl)-acrylic acid chloride, at a temperature in the range of 10 and 25° C. and at a pH-value of between 6.5 and 7.5. This pH-range was maintained by the dropwise addition of a solution of 10 parts by weight of trisodium phosphate in 100 parts by volume of water. After salting out with a sodium chloride solution having a strength of 25% by weight, there was obtained a dyestuff which, in the form of the free acid, corresponded to the formula

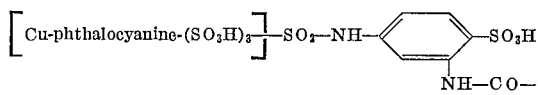

When applied from an alkaline bath according to a two bath padding steaming process, the dyestuff gave on native and regenerated cellulose materials greenish blue shades that showed very good fastness to wet processing.

Further dyestuffs which may be prepared in a manner analogous to that described above are indicated in the following table.

tion, there were placed 10 parts by weight of cotton fabric and, after the addition of 5 parts by weight of a sodium hydroxide solution having a strength of 10% by weight, the fabric was kept in motion for about 30 minutes. After the introduction of air at 80° to 100° C. or by the addition of a dilute solution of an oxidizing agent such as sodium perborate or hydrogen peroxide, the cotton was dyed a reddish blue shade exhibiting excellent fastness to wet processing.

Instead of the alkalies used in the preparation of the dyestuff and in dyeing, there may also be used other agents that have an alkaline action, for example, sodium bicarbonate, sodium carbonate, soda lye, tertiary sodium

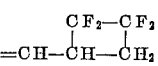

phosphate, and instead of sodium dithionite, there may also be used other reducing agents usual in vat dyeing. The dyeing temperature, too, can be varied to a large extent.

*Example 16*

29 parts by weight of 4-amino-anthraquinone-4′-tri-fluoromethyl-2,1-(N)-1′,2′-(N)-benzeneacridone were re-

| Dyestuff | Tint of the cellulose dyeing |
|---|---|
| [Cu-phthalocyanine—(SO₃H)₃]-NH—⟨SO₃H⟩—NH—CO—CH=CH—CF₂—CF₂—CH—CH₂ | Blue. |
| [Ni-phthalocyanine—(SO₃H)₃]—NH—⟨SO₃H⟩—NH—CO—CH=CH—CF₂—CF₂—CH—CH₂ | Green. |
| [Ni-phthalocyanine—(SO₃H)₃]NH—⟨SO₃H⟩—NH—CO—CH=CH—CF₂—CF₂—CH—CH₂ | Do. |

*Example 15*

36.4 parts by weight of the compound of the formula

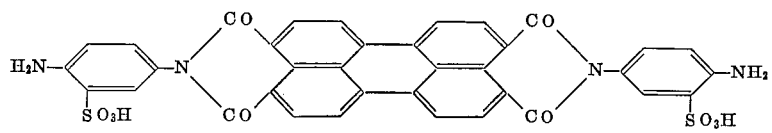

prepared in known manner by the reaction of 1,4-diaminobenzene-2-sulfonic acid with perylenetetracarboxylic acid anhydride at 180° C. in quinoline, were suspended in 500 parts by volume of water; a saturated aqueous solution of 110 parts by weight of sodium dithionite (Na₂S₂O₄·2H₂O) was added and the whole was adjusted to pH 7.5 by means of binormal sodium carbonate solution under an atmosphere of nitrogen. Then, 19.05 parts by weight of 2,2,3,3-tetrafluorocyclobutane carboxylic acid chloride-1 and, simultaneously, further binormal sodium carbonate solution were dropwise added in such a manner that a pH-value of 7.5 to 8 was maintained. The whole was then acidified to pH 2 and upon passing through air at elevated temperature or by the addition of an aqueous solution of an oxidizing agent such, for example, as hydrogen peroxide, there was obtained a precipitate which was the dyestuff of the formula

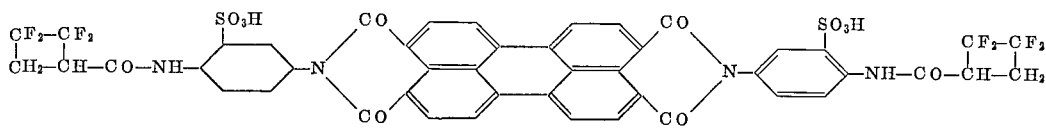

One part by weight of this dyestuff was dissolved in a solution of 2.5 parts by weight of sodium dithionite in 1000 parts by volume of water. Into this red violet soluacted under the conditions described in Example 15 with 10.4 parts by weight of 2-chloro-2,3,3-trifluorocyclobutane carboxylic acid chloride-1 and then precipitated. There was obtained the dyestuff of the formula

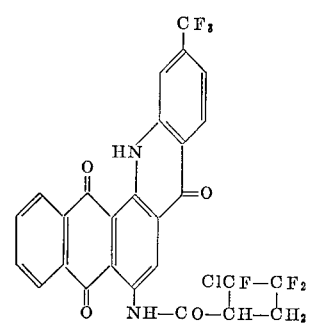

which when applied to cotton according to the dyeing method described in Example 15 gave blue shades having very good fastness to wet processing.

Example 17

43 parts by weight of α-aminonaphthothioxanthene-sulfonic acid of the formula

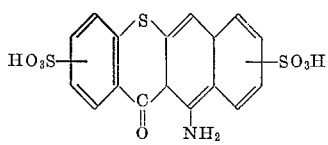

prepared by the reaction of o-mercaptobenzoic acid with 1-aminonaphthalene in sulfuric acid having a density of 1.84 (French Patent 974,872, Example 7), were adjusted to pH 7.5 by means of binormal sodium carbonate solution and acylated by the dropwise addition of a solution of 21.8 parts by weight of 2,2,3,3-tetrafluoro-4,4-dimethylcyclobutane carboxylic acid chloride-1, dissolved in 50 parts by volume of acetone. By simultaneously adding a solution of 4 parts by weight of sodium hydroxide in 50 parts by volume of water, the pH-range of 7.5 to 8 was maintained. After acidification with glacial acetic acid to pH 4, there was obtained by salting out with sodium chloride the dyestuff of the formula

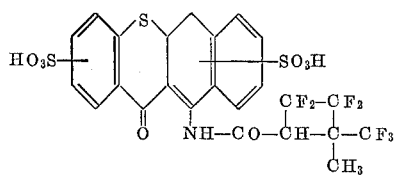

which when applied to cellulose materials from an alkaline bath gave khaki brown shades having good fastness to wet processing.

Example 18

A solution of 46.7 parts by weight of the disodium salt of an aminoazo compound obtained by coupling diazotized 1-amino-benzene-2-sulfonic acid with 2-amino-8-hydroxynaphthalene-6-sulfonic acid, was adjusted to pH 7.5. Then, there were added dropwise 26.3 parts by weight of 4-isobutyl-2-chloro-2,3,3-trifluorocyclobutane-carboxylic acid chloride, dissolved in 100 parts by volume of dioxane and, simultaneously, binormal sodium hydroxide solution in such a manner that a pH-value of 7 to 8 was maintained. At the end of the dropwise addition the addition of sodium hydroxide solution was somewhat reduced so that a final pH-value of 6.5 was obtained. A solution of 11.4 parts by weight of disodium phosphate and 7.3 parts by weight of monopotassium phosphate in 100 parts by volume of water was added and furthermore, for each 100 parts by volume of reaction solution 10 parts by weight of sodium chloride were added. The dyestuff which in the form of the free acid corresponded to the formula

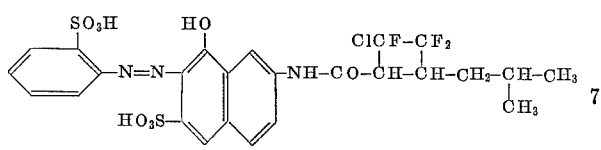

was then filtered off.

Applied to cotton from an alkaline earth bath at 50° C., the dyestuff gave reddish orange dyeings having good fastness to wet processing.

Example 19

37.6 parts by weight of the aminoazo compound prepared by coupling diazotized 4-nitro-1-aminobenzene-2-sulfonic acid with acetoacetic acid anilide-3'-sulfonic acid and subsequent reduction of the nitro group to an amino group with sodium sulfide in aqueous solution, were acylated in a pH-range of 6.5 and 7.5 at a temperature of 10 to 20° C. with 21.7 parts by weight of 2,3,3-trifluoro-cyclobutane-carboxylic acid bromide, dissolved in 50 parts by volume of diethylene glycol dimethyl ether. The pH-range was maintained by the dropwise addition of an aqueous solution of potassium hydroxide having a strength of 10% by weight. After salting out with 15 parts by weight of sodium chloride for each 100 parts by volume of reaction solution, there was obtained the dyestuff of the formula

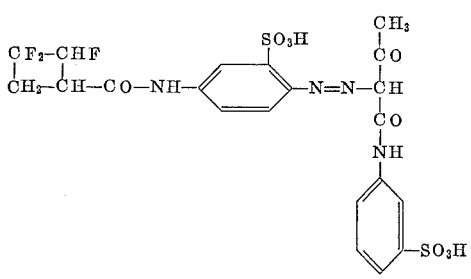

which when applied to fibers from regenerated cellulose in an alkaline bath gave a greenish yellow shade having good fastness to wet processing.

Example 20

48.9 parts by weight of 1-amino-4-(3'-aminophenyl-amino)-anthraquinone-2,4'-disulfonic acid (prepared by the reaction of 1-amino-4-bromoanthraquinone-2-sulfonic acid with 1,3-diaminobenzene-4-sulfonic acid in an aqueous-bicarbonate alkaline medium) were adjusted to pH 8 by means of binormal sodium carbonate solution. Then, there were added dropwise, at 60–70° C., 21.7 parts by weight of 3-(2',2',3',3'-tetrafluorocyclobutyl)-acrylic acid chloride, dissolved in 50 parts by volume of acetone, and, simultaneously, the above mentioned binormal sodium carbonate solution in such a manner, that a pH-value of 7 to 7.5 was maintained. At the end of the addition, the pH-value was kept at 6.5, and after cooling, 20 parts by weight of sodium chloride for each 100 parts by volume of solution were added to precipitate the dyestuff which in the form of the free acid corresponded to the formula

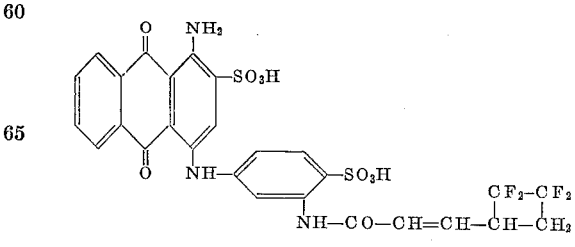

When applied to cellulose fibers according to the exhaust process from a bath rendered alkaline by bicarbonate at 70 to 80° C., the dyestuff gave brilliant blue shades having excellent fastness to washing.

The following table lists further dyestuffs which were prepared in a manner analogous to that described in the above example:

| Dyestuff | Shade of the cellulose dyeing |
|---|---|
| 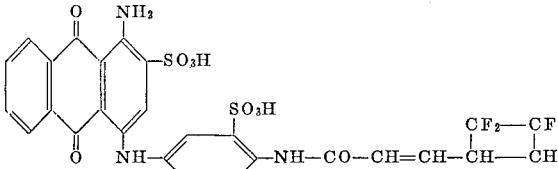 | Greenish blue. |
| 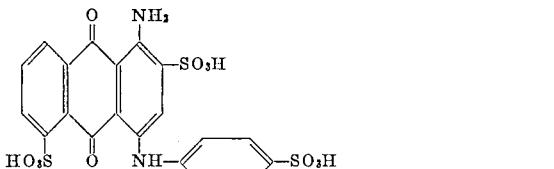 | Blue. |
| 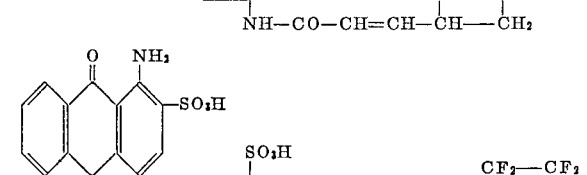 | Greenish blue. |
| 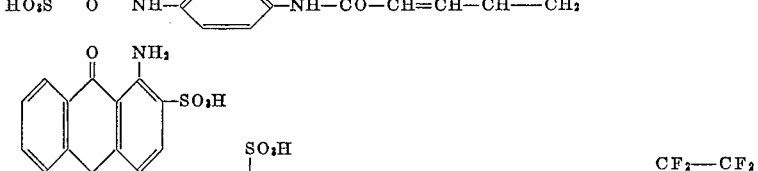 | Olive green. |
| 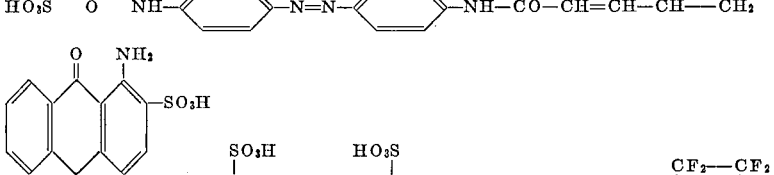 | Green. |
| 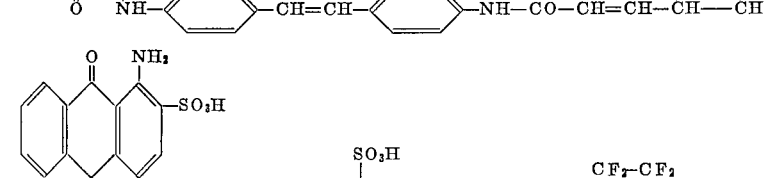 | Greenish blue. |

*Example 21*

58.8 parts by weight of the trisodium salt of the aminoazo compound, obtained by coupling diazotized 1-acetamino-4-aminobenzene-3-sulfonic acid with 1-(4′-sulfophenyl)-5-pyrazolone-3-carboxylic acid and subsequent hydrolysis of the acetyl group by means of sodium hydroxide solution in aqueous solution, were dissolved in water and, at 35–45° C., 21.7 parts by weight of 3-(2′,2′,3′,3′-tetrafluorocyclobutyl)-acrylic acid chloride, dissolved in 50 ml. of acetone, were dropwise added. By the simultaneous addition of an aqueous ammonia solution having a density of 0.96, the pH-value was kept at between 6.5 and 7.5. By the end of the reaction, the addition of ammonia was reduced so that a final pH-value of 6.5 was obtained. A solution of 11.4 parts by weight of disodium phosphate and 7.2 parts by weight of monopotassium phosphate in 100 parts by volume of water was added and finally 15 parts by weight of sodium chloride for each 100 parts by volume of reaction solution were added. The dyestuff obtained by filtration and drying had in form of the free acid of the formula

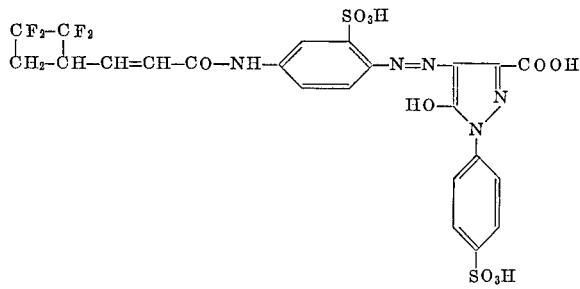

and gave when applied to celulose fibers from a long bath at 50–60° C. a reddish yellow shade that had very good fastness to wet processing.

Example 22

42.2 parts by weight of the aminoazo compound, prepared by coupling diazotized 2-aminonaphthalene-6,8-disulfonic acid with 3-methyl-1-aminobenzene, were adjusted to pH 8 by means of an aqueous sodium hydroxide solution having a strength of 10% by weight. Then, 21.7 parts by weight of 3-(2′,2′,3′,3′-tetrafluorocyclobutyl)-acrylic acid chloride, dissolved in 50 parts by volume of dioxane, were added dropwise at a temperature in the range of 50 and 50° C. By adding further amounts of sodium hydroxide solution, the pH-value was kept at between 7 and 8. The whole was stirred for about 30 minutes at room temperature and acidified to pH 5 by means of glacial acetic acid. 10 parts by weight of sodium chloride were then added for each 100 parts by volume of reaction solution and the whole was filtered. There was obtained a dyestuff which in the form of the free acid had the formula

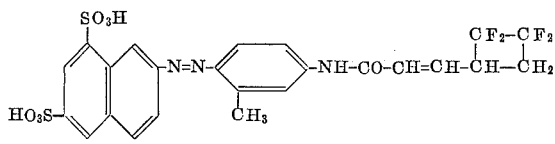

When applied to cellulose fibers from an alkaline bath according to the pad-batch up process, the dyestuff gave reddish yellow dyeings having very good fastness to wet processing.

We claim:
1. A water-soluble dyestuff of the formula

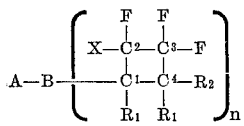

wherein A represents a water-soluble dyestuff radical selected from the group consisting of anthraquinone, phthalocyanine, perylene tetracarboxylic acid amide, benzacridone and naphthothioxanthene dyestuffs, B represents

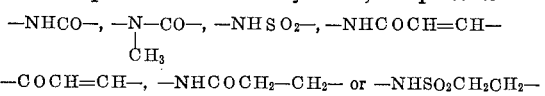

the two substituents $R_1$ represent members selected from the group consisting of hydrogen, chlorine and lower alkyl and together a double bond between $C^1$ and $C^4$, $R_2$ represents a member selected from the group consisting of hydrogen, lower alkyl and phenyl, X represents a member selected from the group consisting of hydrogen, chlorine and fluorine, and $n$ represents an integer from 1 to 5.

2. The dyestuff of the formula

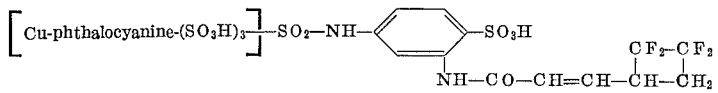

3. The dyestuff of the formula

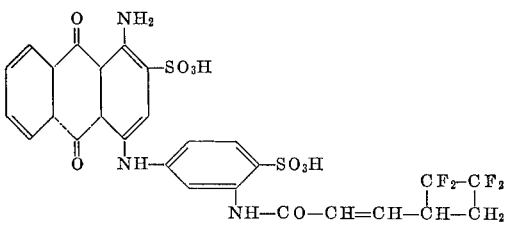

4. The dyestuff of the formula

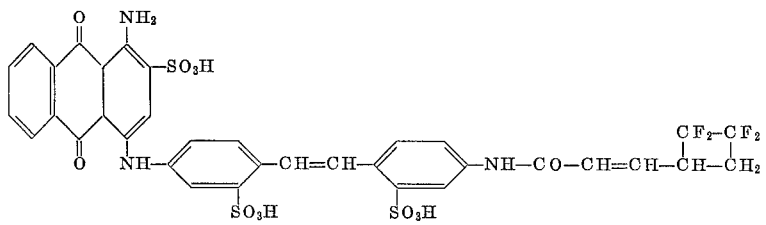

References Cited by the Examiner
UNITED STATES PATENTS

| | | | |
|---|---|---|---|
| 2,700,686 | 1/1955 | Dickey et al. | 260—196 |
| 2,714,587 | 8/1955 | Neier et al. | 260—162 |
| 3,117,962 | 1/1964 | Rohland et al. | 260—162 |
| 3,208,992 | 9/1965 | Bowman et al. | 260—162 |

CHARLES B. PARKER, *Primary Examiner.*

FLOYD D. HIGEL, *Assistant Examiner.*